United States Patent

Jarosz

[15] 3,643,179

[45] Feb. 15, 1972

[54] REACTANCE TUBE CONTROLLED PENTODE OSCILLATOR

[72] Inventor: George J. Jarosz, Chicago, Ill.

[73] Assignee: Admiral Corporation, Chicago, Ill.

[22] Filed: July 30, 1969

[21] Appl. No.: 845,947

[52] U.S. Cl. ....................................331/180, 331/72, 332/28
[51] Int. Cl. ..........................................H03b 3/04, H03c 3/14
[58] Field of Search .........................331/36, 72, 180; 332/28

[56] References Cited

UNITED STATES PATENTS 2,279,030 4/1942 Winlund ..............................332/28 X

FOREIGN PATENTS OR APPLICATIONS 658,837 10/1951 Great Britain ...........................331/36

*Primary Examiner*—Roy Lake
*Assistant Examiner*—Siegfried H. Grimm
*Attorney*—Hill, Sherman, Meroni, Gross & Simpson

[57] ABSTRACT

A reactance oscillator having a pentode as the active oscillator element and having a triode as a variable reactance element. A number of energy storage elements are associated with the pentode oscillator in the usual manner, and one of these elements comprises the variable capacitance of the triode. Feedback from the pentode oscillator is accomplished through an integrating circuit which couples energy of the correct phase to the cathode of the triode. The pentode operates as a peak detector or a class C oscillator, conducting for less than 90° of the operating cycle. Essentially, the signal developed at the cathode of the pentode is a pulse waveform, resulting in a sawtooth waveform after being integrated. The sawtooth waveform, however, has a fundamental frequency which lags the voltage at the anode of the triode by approximately 90°. This fundamental, being coupled to the cathode of the triode, produces a current in the triode which is 180° out of phase. The result is that the current through the triode leads the voltage by approximately 90° producing the desired reactance. The magnitude of this reactance may be varied by varying the applied voltage to the control grid of the triode.

5 Claims, 3 Drawing Figures

INVENTOR.
GEORGE J. JAROSZ

BY Hill, Sherman, Meroni, Gross & Simpson ATTORNEYS

REACTANCE TUBE CONTROLLED PENTODE OSCILLATOR

BACKGROUND OF THE INVENTION

It is well known in the prior art to provide a variable reactance for a pentode oscillator in order to control the phase of oscillation. One such prior art device uses a triode as a variable reactance device with a signal being applied to the grid of the triode to lock the oscillator. In order to have the triode appear as a variable capacitance the current into the tube must lead the voltage at the anode by 90°. Heretofore this has been accomplished by providing a capacitor feedback from the anode of the triode to the control grid. The result is that the grid voltage and the anode current are substantially 90° ahead of the anode voltage thereby providing the desired variable reactance for the pentode oscillator.

FIELD OF THE INVENTION

The field of art to which this invention pertains is oscillator circuits and in particular to circuits for phase locking an oscillator by means of a voltage variable reactance and in particular by means of a triode which is coupled in the oscillator circuit to act as a variable capacitance.

SUMMARY OF THE INVENTION

It is an important feature of the present invention to provide an improved phase-locked oscillator.

It is another feature of the present invention to provide an oscillator having a triode coupled in the oscillator circuit as a variable reactance.

It is a principal object of the present invention to provide an improved means for feedback in an oscillator circuit using a triode as a variable reactance to phase lock the oscillator.

It is also an object of the present invention to provide an oscillating circuit using a triode as a variable reactance and employing feedback from the cathode of the oscillator to the cathode of the triode.

It is another object of the present invention to provide means for integrating the signal appearing at the cathode of the oscillator and for feeding back the integral to the cathode of the triode to provide the desired phase relationship for a variable capacitance.

These and other objects, features and advantages of the invention will be readily apparent from the following description of a certain preferred embodiment thereof, taken in conjunction with the accompanying drawing, although variations and modifications may be effected without departing from the spirit and scope of the novel concepts of the disclosure.

DESCRIPTION OF THE PREFERRED EMBODIMENT

The circuit of the present invention utilizes a pentode and a number of energy storage elements to provide an oscillating network. The phase of the oscillations are continually controlled from an external source. This phase control is accomplished by using a triode which is coupled in the circuit to act as a variable capacitance. The capacitance of the triode is part of the oscillating circuit, and accordingly by varying the capacitance, the phase of the oscillations can be caused to follow the phase of the external source. Such a system may be employed in a television receiver, for instance, where it is desired to develop oscillations in phase with the broadcasted phase information.

In contrast to conventional prior circuits which utilize capacitive feedback from the anode to the control grid of the triode, the present circuit utilizes feedback between the cathodes of the two tubes. The cathode current of the pentode oscillator essentially is a pulse shape, and this pulse is integrated to form a sawtooth waveform. The sawtooth waveform is then applied to the cathode of the triode.

The sawtooth has a fundamental frequency which lags the anode or plate voltage by approximately 90°. The result is that the plate current and plate voltage have the desired relationship to provide a capacitive reactance for the oscillator.

The present invention provides a pentode oscillator circuit which uses a triode as a variable reactance and which is less costly to construct while maintaining a high degree of performance to lock the oscillations of the system with the phase of an incoming signal.

Figure 1:
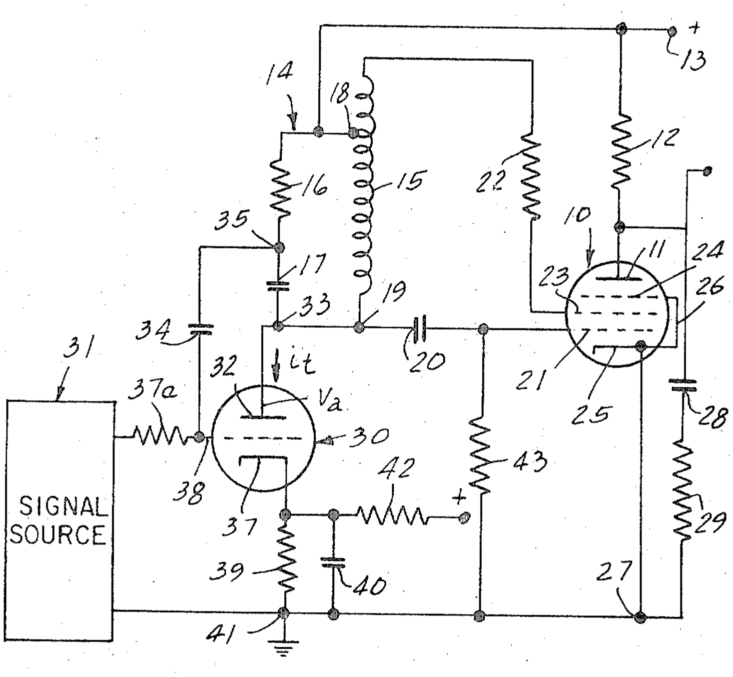
FIG. 1 (PRIOR ART)
FIG. 1 is a schematic of a prior art oscillator showing the feedback circuit from the anode to the grid of the triode to establish the desired quadrature relationship between the current and voltage thereof.

Referring to the drawings in more detail, the prior art schematic shown in FIG. 1 has a pentode 10 as the amplifying device in the oscillating circuit. The pentode 10 has an anode 11 coupled through a plate resistance 12 to a B+ voltage supply at 13.

The resistor 12 is coupled to a parallel circuit 14 which includes an inductor 15, a resistor 16 and a capacitor 17. The B+ voltage supply is coupled from the point 13 to a tap 18 on the inductor 15. The inductor 15 and the capacitor 17 are then coupled together as at 19 and through a coupling capacitor 20 to the control grid 21 of the pentode 10.

The inductor 15 is coupled through a resistor 22 directly to the screen grid 23 of the pentode 10.

The suppressor grid 24 is directly connected to the cathode 25 by means of a connection 26. The cathode 25 is grounded as at 27. The plate 11 is coupled through a capacitor 28 and a resistor 29 directly to the cathode as at point 27.

In addition to the energy storage elements such as the inductor 15 and the capacitor 17 which determine the frequency of operation of the oscillator, a triode 30 is coupled in the circuit to act as a variable capacitance and thereby to maintain the phase of oscillations of the pentode 10 in synchronism with the phase of oscillations at an external source as indicated generally at 31.

The triode 30 has a plate 32 which is coupled to a circuit point 33 at the parallel circuit 14. A capacitor 34 is connected from a point 35 intermediate the resistor 16 and the capacitor 17 to the control grid 36 of the triode 30. A coupling resistor **37*a* is connected between the external source 31 of phase control voltage and the control grid 38**.

The cathode 37 of the triode 30 is coupled to a parallel combination of a resistor 39 and a bypass capacitor 40. The resistor 39 and capacitor 40 are coupled directly to ground as at point 41. The B+ voltage supply is coupled to the cathode 38 through a large resistance 42. Bias for the control grid 21 of the pentode 10 is provided by a resistor 43 which is coupled from the control grid to circuit ground at 41.

The capacitor 34 provides feedback between the plate and grid of the triode 30 in such a way as to cause the triode to act as a capacitive reactance. In the prior art embodiment, the current through the capacitor 34 and the grid voltage of the triode 30 and the plate current will lead the plate voltage by approximately 90°. Since this is the desired phase relationship for a capacitance, changes in magnitude of the signal applied to the grid 38 from the external source 31 will result in changes in the magnitude of the plate current, thereby effectively changing the value of the capacitance presented by the triode.

Figure 2:
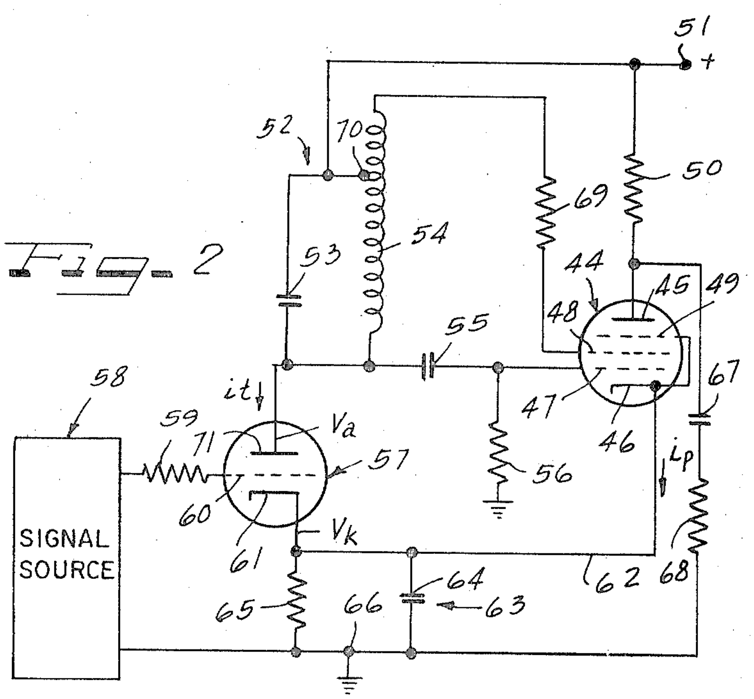
FIG. 2 is a schematic illustrating the present invention and showing the integrating circuit for feeding back the proper phase information from the cathode of the pentode oscillator to the cathode of the triode.

The preferred embodiment of the present invention as shown in FIG. 2 utilizes a pentode 44 having a plate 45, a cathode 46 and first, second and third grids 47, 48 and 49. As in the prior art example, the suppressor grid 49 is coupled directly to the cathode 46. Also, the plate 45 is coupled through a resistor 50 similar to the resistor 12 to a B+ voltage supply at 51.

A parallel circuit 52 consisting of a capacitor 53 and a coil 54 is coupled from the plate circuit through a coupling capacitor 55 directly to the control grid 47 of the tube 44. A grid leak resistor 56 is coupled from the capacitor 55 to circuit ground as shown.

As in the prior art configuration, a triode 57 provides a variable reactance to the oscillating circuit to phase lock an incoming signal from a source 58 which is applied through a resistor 59 to the control grid 60 of the tube 57.

Unlike the prior art example, however, a feedback path is not provided between the plate and grid of the triode 57. Rather, a feedback path is provided between the cathode 46 of the pentode 44 and the cathode 61 of the triode 57. In particular, the cathode 46 is coupled through a circuit line 62 to an integrating circuit 63 which includes the parallel combination of a capacitor 64 and a resistor 65. The integrating circuit 63 is coupled from the cathode 46 to circuit ground as at 66 and to the cathode 61. Accordingly, the integrating circuit 63 may be said to have an input between the line 62 and ground at 66 and an output between the cathode 61 and circuit ground.

The plate of the pentode 44 is also coupled to circuit ground through a capacitor 67 and a resistor 68 similar to the elements 28 and 29 of FIG. 1. Also similar to FIG. 1, the screen grid 48 is provided with its bias level by means of a resistor 69 which is coupled directly to the B+ supply at 51 through a tap 70 on the coil 54.

Figure 3:
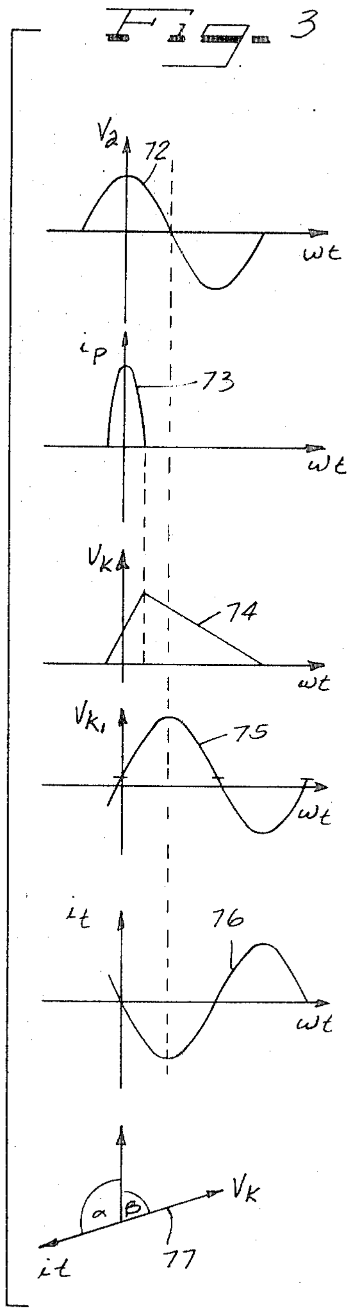
FIG. 3 is a series of six graphs illustrating the various waveforms found at specific points in the circuit of FIG. 2 and illustrating the phase relationships between these waveforms.

The voltage at the plate 71 of the triode 57 is indicated as Va in FIG. 3. This waveform 72 is essentially cosine wave.

In both the circuits of FIG. 1 and FIG. 2, the pentode oscillator acts as a peak detector or a class C oscillator. The cathode current is indicated generally by the waveform 73 and generally takes the form of a pulse.

The current 73 is integrated in the integrator 63, and the resulting voltage as applied to the cathode 61 of the triode 57 is a sawtooth configuration 74.

The sawtooth 74 has a fundamental frequency 75 which when compared with the waveform 72 is lagging by approximately 90°.

Since the current through the tube 57 is 180° out of phase with the voltage 75, that current is indicated by reference numeral 76. By comparing the current 76 with the voltage 72, it can be seen that the current in the triode 57 leads the voltage at the plate of the tube by approximately 90°. This is the desired relationship for a capacitance. As in the case of FIG. 1, an external signal applied to the grid 60 of the tube 57 will vary the magnitude of the capacitance as required to lock the oscillator.

The phase relationship between the plate voltage, the plate current, and the cathode voltage of the tube 57 is indicated generally by the graph 77. In the example shown, the angle alpha is slightly more than 90° and the angle beta is slightly less than 90°.

Through the use of the circuit shown in FIG. 2, the resistor 16 and the capacitor 34 of FIG. 1 are eliminated. It is not necessary to provide the B+ supply to the cathode 38 as shown in FIG. 1, and accordingly the large resistor 42 is eliminated. Also, the capacitor 40 of FIG. 1 is eliminated and replaced with a much smaller capacitor which may be in the order of one-half of 1 percent the size of the capacitor 40. The precise values of the circuit elements will depend upon the circuit parameters, however it suffices to say that the values of the resistor 65 and capacitor 64 are chosen to provide an integrating network for the cathode current of the tube 44, and the value of the resistor 65 is also chosen to provide the correct bias for the cathode 61 of the triode 57.

I claim as my invention:

1. A reactance oscillator circuit comprising:

a class C oscillator for developing a generally pulse-shaped current waveform, a reactance tube having an anode, a cathode and a control grid, said reactance tube being coupled in a closed circuit loop with said oscillator, means for coupling an oscillator locking signal to said control grid of said reactance tube, an integrator circuit, means for coupling said generally pulse-shaped current of said oscillator to said integrator circuit, and means for coupling the output of said integrator circuit to the cathode of said reactance tube, whereby said reactance tube may be used to control the phase of oscillations of said oscillator.

2. A reactance oscillator in accordance with claim 1 wherein said integrator circuit comprises a capacitor to provide a substantial sawtooth of voltage at the cathode of said electron control device.

3. A reactance oscillator in accordance with claim 2 wherein said cathode of said amplifier device and the cathode of said electron control device are directly connected together and wherein said capacitor is coupled in a circuit path from said cathodes to circuit ground.

4. A reactance oscillator in accordance with claim 3 wherein a resistor is coupled in parallel with said capacitor.

5. A reactance oscillator comprising:

a pentode and a number of energy storage elements together forming an oscillator circuit, a triode forming part of said oscillator, a feedback circuit coupled between the cathodes of said pentode and said triode, said feedback circuit including an integrator circuit to provide a voltage waveform at the plate of said triode which is substantially in quadrature with the current therethrough, said integrator circuit developing a generally sawtooth-shaped voltage at the cathode of said triode and the fundamental frequency component of said sawtooth current lagging the current through the triode by approximately 90°.

* * * * *